(12) United States Patent
Ikeda

(10) Patent No.: US 10,097,923 B2
(45) Date of Patent: Oct. 9, 2018

(54) EAR MODEL, ARTIFICIAL HEAD, AND MEASUREMENT DEVICE USING SAME, AND MEASUREMENT METHOD

(71) Applicant: KYOCERA Corporation, Kyoto (JP)

(72) Inventor: Tomoyoshi Ikeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/423,989

(22) Filed: Feb. 3, 2017

(65) Prior Publication Data

US 2017/0150265 A1 May 25, 2017

Related U.S. Application Data

(62) Division of application No. 14/914,665, filed as application No. PCT/JP2014/003444 on Jun. 27, 2014, now Pat. No. 9,800,974.

(30) Foreign Application Priority Data

Aug. 28, 2013 (JP) ................................ 2013-177082
May 16, 2014 (JP) ................................ 2014-102358

(51) Int. Cl.
*G01H 11/00* (2006.01)
*H04R 5/027* (2006.01)
(Continued)

(52) U.S. Cl.
CPC .............. *H04R 5/027* (2013.01); *G01H 3/00* (2013.01); *G01H 11/08* (2013.01); *H04R 1/1091* (2013.01); *H04R 29/001* (2013.01)

(58) Field of Classification Search
CPC ........... H04R 5/027; G01H 3/00; G01H 11/08
(Continued)

(56) References Cited

U.S. PATENT DOCUMENTS

2006/0126855 A1* 6/2006 Geiger ................... H04R 5/027
381/56
2009/0069904 A1 3/2009 Picha
(Continued)

FOREIGN PATENT DOCUMENTS

EP 2 925 022 A1 9/2015
JP S58-198338 A 11/1983
(Continued)

OTHER PUBLICATIONS

The extended European search report issued by the European Patent Office dated May 19, 2017, which corresponds to European Patent Application No. 14840947.7-1905 and is related to U.S. Appl. No. 15/423,989.
(Continued)

*Primary Examiner* — Son Le
*Assistant Examiner* — Tarun Sinha
(74) *Attorney, Agent, or Firm* — Studebaker & Brackett PC

(57) ABSTRACT

Provided is a measurement device that evaluates an acoustic device 100 including a vibrating element and configured to allow sound to be heard by vibration transmission. The measurement device includes: an ear model unit 50 including an ear model 51 that is molded after a human ear and an artificial cartilage unit 54 that is joined to the ear model 51; and a vibration detector 56 disposed in the ear model unit 50.

6 Claims, 4 Drawing Sheets

(51) Int. Cl.
*H04R 1/10* (2006.01)
*H04R 29/00* (2006.01)
*G01H 3/00* (2006.01)
*G01H 11/08* (2006.01)

(58) Field of Classification Search
USPC .......................................................... 73/649
See application file for complete search history.

(56) References Cited

U.S. PATENT DOCUMENTS

| | | | |
|---|---|---|---|
| 2009/0123015 A1* | 5/2009 | Saltykov | H04R 25/604 |
| | | | 381/328 |
| 2010/0177910 A1* | 7/2010 | Watanabe | H04R 5/033 |
| | | | 381/94.1 |
| 2012/0088215 A1 | 4/2012 | Bellezzo et al. | |
| 2016/0134977 A1 | 5/2016 | Inagaki | |

FOREIGN PATENT DOCUMENTS

| | | |
|---|---|---|
| JP | 2005-348193 A | 12/2005 |
| JP | 2013-143612 A | 7/2013 |

OTHER PUBLICATIONS

International Search Report—PCT/JP2014/003444 dated Sep. 2, 2014.
Written Opinion—PCT/JP2014/003444 dated Sep. 2, 2014, with English language Concise Explanation.
Rohm Co., Ltd.; A new proposal on a smart phone applying cartilage transmission; Achieving comfortable calls in noisy conditions via corner vibration; Apr. 23, 2012; http://www.rohm.co.jp/web/japan/news-detail.
An Office Action; "Notice of Reasons for Rejection," issued by the Japanese Patent Office dated Nov. 11, 2014, which corresponds to Japanese Patent Application No. 2014-023627; and is related to the present application; with English language Concise Explanation.
An Office Action issued by the U.S. Patent Office dated Apr. 19, 2017, which corresponds to U.S. Appl. No. 14/914,665 and is related to U.S. Appl. No. 15/423,989.

* cited by examiner

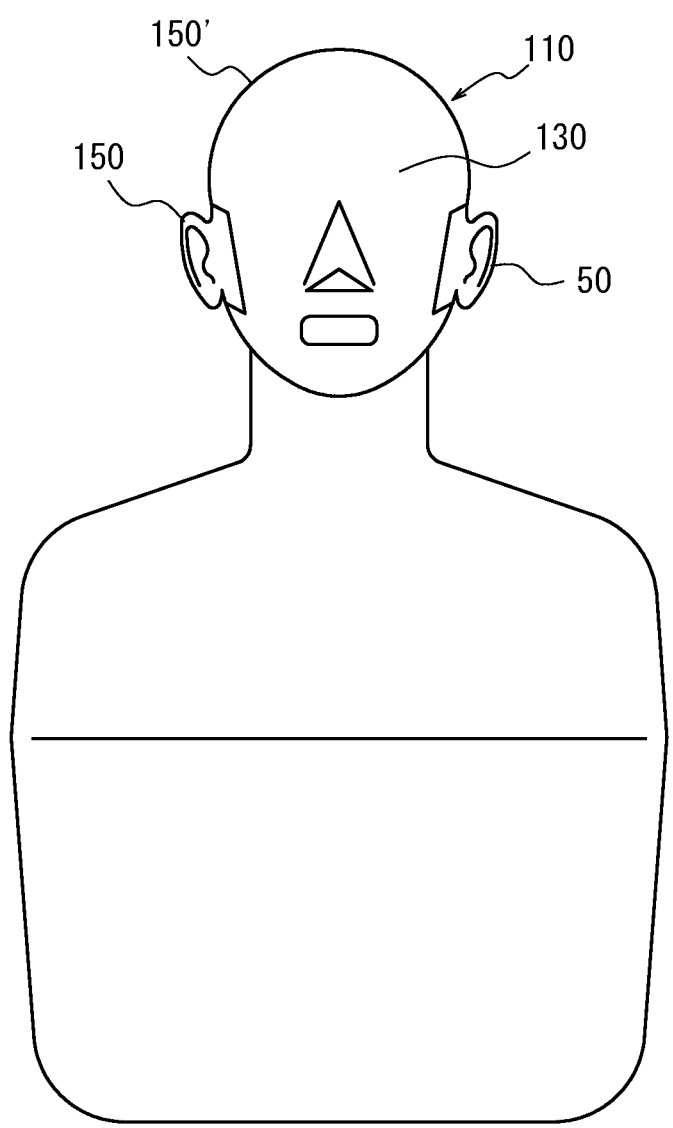

EAR MODEL, ARTIFICIAL HEAD, AND MEASUREMENT DEVICE USING SAME, AND MEASUREMENT METHOD

CROSS-REFERENCE TO RELATED APPLICATION

This application is a Divisional Application of U.S. patent application Ser. No. 14/914,665 filed on Feb. 26, 2016, which is a U.S. National Phase Application of International Patent Application No. PCT/JP2014/003444, filed on Jun. 27, 2014, claims priority to and the benefit of Japanese Patent Application No. 2013-177082 filed on Aug. 28, 2013 and Japanese Patent Application No. 2014-102358 filed on May 16, 2014, the entire contents of which are incorporated herein by reference.

TECHNICAL FIELD

The present disclosure relates to a measurement device or the like that evaluates an acoustic device, such as a mobile phone, an earphone, and a headphone, including a vibrating body and configured to allow sound to be heard via vibration transmission by placing the acoustic device within a human ear or pressing the acoustic device against the ear.

BACKGROUND

Patent Literature 1 describes an acoustic device, such as a mobile phone, that transmits air conduction sound and bone conduction sound to a user. Patent Literature 1 also describes that the air conduction sound is sound perceived by the auditory nerve of a user as a result of the eardrum being vibrated by air vibrations, created by a vibration of an object, that travel through the external auditory canal down to the eardrum. Furthermore, Patent Literature 1 describes that the bone conduction sound is transmitted to the auditory nerve of the user through a part of a user's body (e.g. a cartilaginous portion of the external ear) that is in contact with the vibrating object.

In the telephone described in Patent Literature 1, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexure vibration. As a result, when the user places the vibration body in contact with the auricle, the air conduction sound and the bone conduction sound are transmitted to the user.

Apart from a telephone that transmits sound by being held in the hand and pressed against the ear, examples of other devices that transmit sound based on such a transmission principle include cartilage transmission earphones and headphones that are used by being hooked and held somewhere on the human head.

CITATION LIST

Patent Literature

Patent Literature 1: Japanese Patent Application Publication No. 2005-348193

SUMMARY

Technical Problem

To evaluate an acoustic device, such as the aforementioned telephone and a cartilage transmission earphone or a headphone used by being hooked and held somewhere, including the ear, on the human head, that transmits bone conduction sound to the user via the cartilage of the outer ear, the present inventor has recognized the necessity of measuring the amount of vibration that acts approximately on the human auditory nerve due to vibration of the vibrating body.

The present disclosure has been conceived in view of the above recognition, and the present disclosure is to provide a measurement device, a measurement method, and the like that measure an amount of vibration weighted for characteristics of vibration transmission in a human ear and that evaluate an acoustic device including a vibrating body.

Solution to Problem

The present disclosure allows measurement of the amount of vibration taking into account the characteristics of vibration transmission to a human ear and also allows evaluation of an acoustic device, a hearing aid, or the like including a vibrating body.

A measurement method of measuring an acoustic device configured to allow sound to be heard by vibration transmission to a human body, the measurement method comprising the steps of: bringing the acoustic device into abutment with an ear model unit including an ear model that is molded after a human ear and an artificial external ear canal unit that is continuous with the ear model; and generating test sound from the acoustic device; detecting, by a microphone disposed in the ear model unit, air conduction radiation components in an inner wall of the artificial external ear canal unit; and detecting vibration propagated to the ear model unit, by a vibration detector disposed in the ear model unit.

BRIEF DESCRIPTION OF THE DRAWINGS

In the accompanying drawings:

FIG. 7 illustrates a schematic configuration of a measurement device according to the second embodiment of the present disclosure.

DETAILED DESCRIPTION

The following describes embodiments of the present disclosure with reference to the drawings.

First Embodiment

Figure 1:
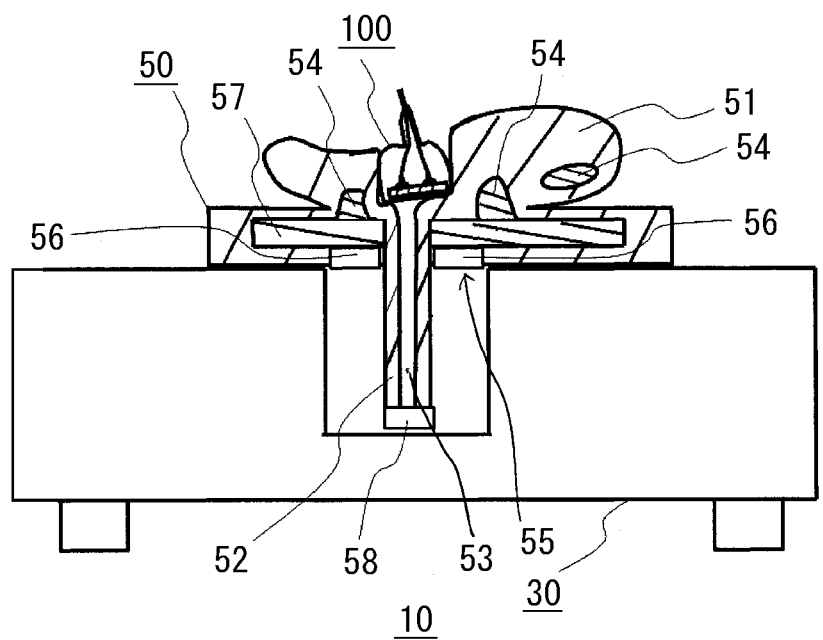
FIG. 1 is a sectional view illustrating a schematic configuration of a measurement device according to the first embodiment of the present disclosure.
Figure 2:
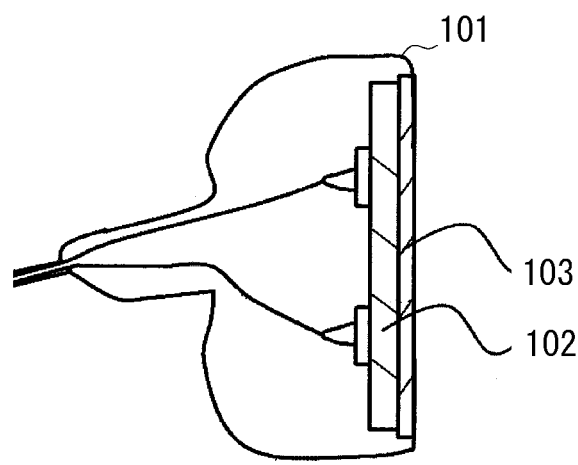
FIG. 2 is a sectional view of an earphone as an example targeted for measurement.

FIG. 1 illustrates a schematic configuration of a measurement device according to the first embodiment of the present disclosure. A measurement device 10 according to the present embodiment includes an ear model unit 50 supported on a base 30. In the following description, a cartilage transmission earphone is illustrated as an example of an acoustic device 100. As illustrated in FIG. 2, the acoustic device 100 includes a housing 101 to be inserted in the hole of the human ear and a piezoelectric element 102 within the housing 101. The housing 101 is vibrated by the piezoelectric element 102. The acoustic device 100 includes, in a portion thereof that is to abut against the human ear, a protective film made of a rubber material 103. The rubber material 103 serves to mitigate external friction, impact, or the like and may be omitted. Accordingly, the protective film may have a sheet shape that is less likely to interfere with vibration transmission. The protective film may be a plate-shaped coating member, made of an acryl resin or the like, that covers the piezoelectric element 102.

Next, the ear model unit 50 according to the measurement device of the present disclosure is described.

As illustrated in FIG. 1, the ear model unit 50 is supported on the base 30 at the periphery of an artificial external ear canal unit 52. Herein, the ear model unit 50 may be detachable from the base 30. The ear model unit 50 may also be fixed by using an adhesive resin or a double-side adhesive tape.

The ear model unit 50 is molded after a human ear and includes an ear model 51, an artificial external ear canal unit 52 joined to or formed integrally with the ear model 51, an artificial cartilage unit 54 embedded in the ear model 51, and a board 57 joined partly to or formed integrally with the artificial cartilage unit 54.

The ear model 51 has an ear-shaped portion and a portion that is large enough to cover the ear-shaped portion and that is provided in the middle thereof with a hole. The hole forms an artificial external ear canal 53 connected to a sound path formed in the cylindrical artificial external ear canal unit 52.

The ear model 50 may have substantially the same shape as a shape of an average ear model used in, for example, a manikin such as a Head And Torso Simulator (HATS), Knowles Electronic Manikin for Acoustic Research (KEMAR), or the like. The ear model 51 may be made from substances constituting, for example, a material conforming to IEC 60318-7. This material may, for example, be formed with silicone rubber or the like having a Shore hardness of 30 to 60 (such as a Shore hardness of 35 or 55). Since the present embodiment includes the artificial cartilage unit 54, to approximate the hardness of the ear model 51 that has been embedded with the artificial cartilage unit 54 to, for example, the hardness of a conventional ear model not including the artificial cartilage unit 54 and made of a material having a Shore hardness of 35 or 55, the material of the ear model 51 itself may be a material having softness with a Shore hardness of less than 35, such as a Shore hardness of 20 to 30. In the ear model 51, the tragus, the antitragus, the helix and so forth are formed.

The artificial external ear canal unit 52 is connected to the hole provided in the ear model 51 to extend cylindrically to a direction opposite to the acoustic device 100. The artificial external ear canal unit 52 has, for example, a Shore hardness approximately of 20 to 60 and made from the same substances as those of the ear model 51. The artificial external ear canal unit 52 may be made from soft substances, such as silicone rubber and natural rubber.

Insufficient thickness of the artificial external ear canal unit 52 leads to difficulty in processing, and excessive thickness of the artificial external ear canal unit 52 might lead to failure in faithfully simulating acoustic radiation components in the external ear canal transmitted from the acoustic device 100 by vibration (the acoustic radiation components referring to components transmitted to the eardrum as a result of air within the external ear canal being vibrated due to vibration of the inner wall of the external ear canal and detected as air conduction sound). Accordingly, the artificial external ear canal unit 52 preferably has, for example, a thickness approximately of 0.3 mm to 2 mm and has, for example, a diameter (inner diameter) approximately of 3 mm to 15 m. The artificial external ear canal unit 52 may, of course, be manufactured integrally with the ear model 51 by using a mold or a 3D printer. The artificial external ear canal unit 52 and the ear model 51 may be manufactured separately as independent members and subsequently joined by an adhesive agent or the like. In this case, the adhesive agent is preferably an adhesive agent having the same composition in consideration of the material of the ear model 51 and the artificial external ear canal unit 52. For example, when the ear model 51 and the artificial external ear canal unit 52 are made from silicone rubber, a silicone-based adhesive agent is preferably used as the adhesive agent. Although in FIG. 3 the artificial external ear canal unit 52, in the section thereof, has a rectangular cylindrical shape, the shape is not limited to rectangular.

The length of the artificial external ear canal 53, i.e., the length from an opening of the hole provided in the ear model 51 to a terminal end of the artificial external ear canal unit 52, preferably corresponds to the length from an opening of the hole of the human ear to the eardrum and may be set suitably, for example, in the range of 5 mm to 40 mm. The length of the artificial external ear canal 53 is, for example, approximately 30 mm.

Figure 4:
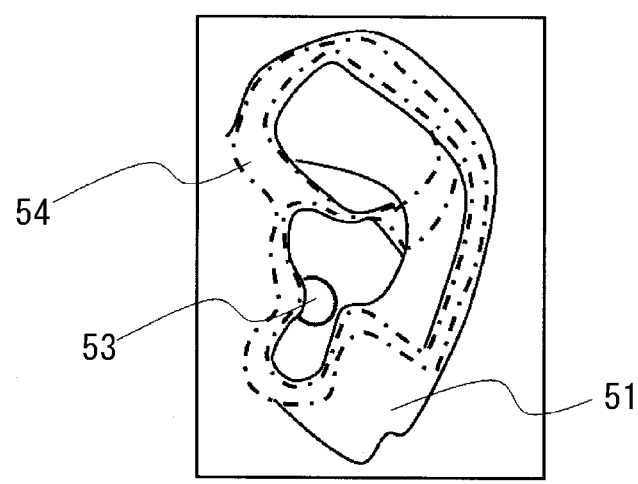
FIG. 4 is a top view of an ear model.
Figure 5:
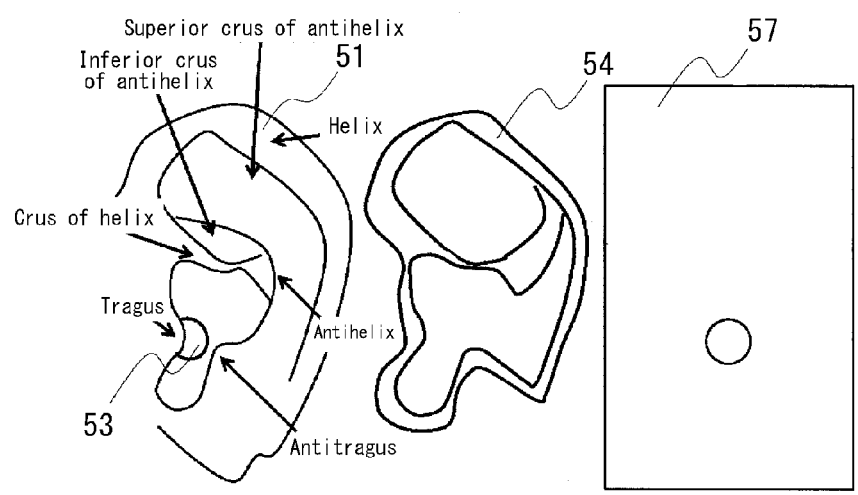
FIG. 5 is an exploded view of an ear model.

As illustrated in FIGS. 4 and 5, the artificial cartilage unit 54 is embedded in the ear model 51. The artificial cartilage unit 54 is molded after the cartilage of the human ear and has a substantially O-shape or truncated chevron shape. The artificial cartilage unit 54 is suited for maintaining the shape of the ear model 51 and reproducing vibration transmission from the acoustic device 100 even more faithfully. The artificial cartilage unit 54 may be formed by using, for example, plastic, such as polyethylene terephthalate (PET), natural rubber, and thinly molded polyvinyl chloride, or lactate polymer, which is a biomaterial. As described earlier, the material, thickness, or the like of the artificial cartilage unit 54 are regulated so that a composite body in which the artificial cartilage unit 54 has been embedded in the ear model 51 may have bending strength that is equivalent to bending strength of a conventionally well-known ear model made of a material having a Shore hardness of 35 or 55.

The artificial cartilage unit 54 is preferably present in a position corresponding to the tragus, the antitragus, the antihelix, the inferior crus of antihelix, the superior crus of antihelix, the helix, and the crus of helix as illustrated in FIGS. 4 and 5 to provide compatibility with various types of acoustic devices that are pressed against the ear differently.

When only a specific type is targeted for measurement, the artificial cartilage unit 54 only needs to be present in a necessary position corresponding to this type. For example, the artificial cartilage unit 54 may be present only in the tragus or in the tragus and the antitragus. As the artificial cartilage unit 54, artificial cartilage obtained by culturing, in a cartilage-shaped lactate polymer die formed by a 3D printer, a cartilage cell extracted from an actual human body, cow, sheep, or the like.

The board 57 is a plate-like member that supports the ear model 51. The board 57 may be made of a metallic material, such as SUS and aluminum, a resin material, such as a polycarbonate resin or an acrylic resin, or a biomaterial, such as lactate polymer.

The thickness of the board 57 varies depending on the material. When the board 57 is made of metal, the thickness is preferably approximately from 0.5 mm to 3 mm, and when the board 57 is made of a material other than metal, the thickness is preferably approximately from 1 mm to 5 mm. The area of the board 57 is large enough to cover the entire ear body of the ear model 51, thus facilitating support of the ear model 51. The length and width of the board 57 are, for example, approximately from 2.5 cm to 6 cm. The board 57 is partly joined to the aforementioned ear model 51 and the artificial cartilage unit 54. Accordingly, vibration is propagated from the artificial cartilage unit 54 or the ear model 51 to the board 57. The board 57 is provided with a hole that is larger than the hole of the ear model 51 and an outer diameter of the artificial external ear canal unit 52, to form the hole of the ear model 51 or to let the artificial external ear canal unit 52 be inserted.

Figure 3:
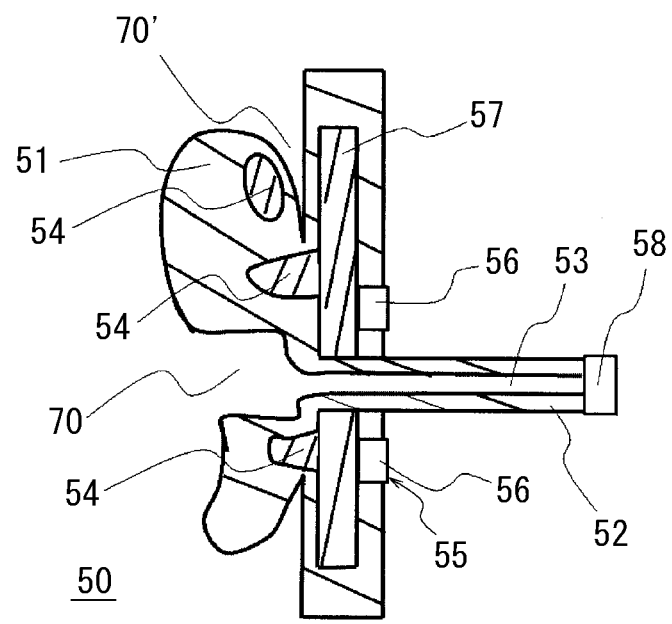
FIG. 3 is a sectional view of an ear model unit.

In the ear model unit 50, a vibration detector 55 is disposed on the back side of the board 57. The vibration detector 55 includes a vibration detection element 56, such as a piezoelectric acceleration pickup. FIG. 3 illustrates an example in which a plurality of chip-like vibration detection elements 56 is disposed in the board 57 and at the periphery of the artificial external ear canal 53. The number of the vibration detection elements 56 may be one. When a plurality of the vibration detection elements 56 is disposed, the vibration detection elements 56 may be disposed at a timely interval at the periphery of the artificial external ear canal 53 or may be disposed in an arcuate fashion to surround the periphery of the opening of the artificial external ear canal 53. The vibration detection element 56 may be, for example, embedded in the ear model 51 on the back side of the board 57, and a lead wire (which is not illustrated) may be drawn to the outside of the ear model unit 50. The vibration detection element 56 is adhered to the board 57 by an adhesive agent or the like.

The vibration detection element 56 disposed in the board 57 largely reproduces vibration transmission occurring in the cartilage of the human ear. That is to say, when disposed at the periphery of the artificial external ear canal 53, the vibration detection element 56 measures the behavior of vibration directed from the outer ear to the inner ear at the side face of the human external ear canal. Furthermore, when in a position apart from the artificial external ear canal 53, the vibration detection element 56 measures vibration components transmitted from the human external ear canal to the inner ear without passing through the eardrum.

The vibration detection element 56 may be selected from among commercially available elements, such as an ultra-compact and light-weight type NP-2106 manufactured by Ono Sokki Co. Ltd., and PV-08A, PV-90B, or the like manufactured by Rion Co., Ltd. The vibration detection element 56 weighed approximately 0.2 g, such as TYPE7302 manufactured by Aco Co., Ltd., is preferred due to the light weight.

In the terminal end of the artificial external ear canal unit 52 (that corresponds to the human eardrum), a microphone 58 is disposed. The microphone 58 is configured to detect air conduction sound that has passed through the artificial external ear canal 53. The microphone 58 is also configured to detect air conduction radiation components generated in the artificial external ear canal 53 due to vibration of the hole of the ear model 51 or the inner wall of the artificial external ear canal unit 52.

Next, a description is given of a holder 70 and a holder 70' in which the acoustic device 100, such as an earphone, is held. As illustrated in FIG. 3, when the acoustic device 100 is a vibration transmission earphone, the housing 101 of the earphone is partly of entirely inserted in the hole of the ear. Since the ear model unit 50 is molded after the shape of the human ear and is provided with the auricle and the external ear canal, the earphone may be inserted into the auricle and the external ear canal. That is to say, the hole of the ear of the ear model 51 serves as the holder 70. Or, in cases of a hearing aid that may be hooked on the ear, the auricle of the ear model 51 itself serves as the holder 70'.

Figure 6:
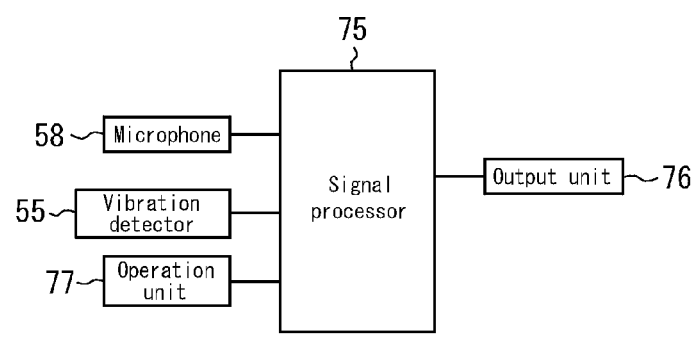
FIG. 6 is a function block diagram of a part of the measurement device illustrated in FIG. 1.

FIG. 6 is a function block diagram of a part of the measurement device 10 according to the present embodiment. The vibration detector 55, which includes one or more vibration detection elements 56, is connected to a signal processor 75. Based on the output of (each) vibration detection element 56, the signal processor 75 calculates the amount of vibration generated by the acoustic device 100 and propagated to the human body. Herein, an operation unit 77 including a conventionally well-known touch panel or press keys may be used to allow selection of a targeted vibration detection element 56 for which the input is to be detected and evaluated. Alternatively, the amounts of vibration of a plurality of vibration detection elements 56 may be equalized. The signal processor 75 processes a detection signal of the microphone 58. By doing so, the signal processor 75 detects and evaluates a total sum of air conduction sound from acoustic device 100 and air conduction radiation components generated in the auricle due to vibration.

Processing contents of the signal processor 75 may include, for example, generation of a measurement signal (pure sound, pure sound sweep, multi-sine wave, or the like). The signal processor 75 may include an equalizer and a dynamic range compressor. Preferably, the signal processor 75 also performs phase adjustment processing, phase synthesis processing, Fast Fourier Transform processing, or the like with respect to the detected signal. The signal processor 75 may analyze sub-harmonic or harmonic distortions. The signal processor 75 may perform conversion to various file formats in accordance with the output form of an output unit 76. Results of the measurement processed in the signal processor 75 are outputted to the output unit 76, such as a display, a printer, and a storage, for evaluation of the acoustic device 100.

In this way, the measurement device 10 according to the present embodiment is capable of measuring the vibration level weighed for characteristics of vibration transmission of the human ear, thus allowing accurate evaluation of the acoustic device 100.

The vibration level corresponding to vibration transmission through the human cartilage correlates with a certain sound pressure level corresponding to a vibration detection value detected by the vibration detection element 56. This correlation may be obtained in advance by performing, when initially manufacturing the measurement device, a calibration by a standard tuning method, threshold method, or the like on numerous actual subjects. Especially in the calibration of vibration components, those who suffer from conduction deafness may be adopted as the subjects.

Second Embodiment

FIG. 7 illustrates a schematic configuration of a measurement device according to the second embodiment of the present disclosure. The measurement device 110 according to the present embodiment further includes a human head model 130. The ear model unit 50 and the measurement system are substantially the same as those of the above embodiment. Although the head model 130 may be made of substantially the same material as the material of the HATS, the KEMAR, or the like, the head is provided inside thereof with a relatively large cavity in which the aforementioned ear model unit 50 and the measurement system, such as the microphone 58 or the vibration detector 55, may be received. The ear model unit 50 of the head model 130 is detachable from the head model 130. That is to say, an entirety or a part of the ear model unit 50 may be formed as an exchangeable part. For example, the ear model 51, which is made of a resin, sometimes deteriorates over time and suffers from a change in vibration characteristics, and for the purpose of preventing this problem, forming the ear model 51 as an exchangeable part is effective.

Holders 150 and 150' refer to portions that hold the acoustic device 100, such as a head phone, an eyeglass-type bone conduction hearing aid, or the like. For example, the head 130 itself or the auricle of the ear model 51 serves as the holders 150 and 150'.

The measurement device 110 according to the present embodiment provides substantially the same effect as that of the measurement device 10 according to the first embodiment. Among other effects, in the present embodiment, the acoustic device 100 is evaluated by detachably mounting the ear model unit 50 on the human head model 130, thus allowing evaluation that conforms more closely to the actual form of use by considering the influence of the head.

The present disclosure is not limited to the above embodiments, and a variety of modifications and changes are possible. For example, although in the above embodiments the acoustic device 100 targeted for measurement is assumed to be mainly an acoustic device, such as an earphone, in which a piezoelectric vibrator 102 vibrates and transmits the vibration to the housing 101 to thereby vibrate the ear via the housing, the acoustic device is not limited to the embodiments. It would be easy to similarly evaluate the acoustic device by a holder that holds the acoustic device, even when, for example, the acoustic device is the one, such as a headphone held by the human head, that is used by covering the entire ear, the one that transmits vibration to the ear via the acoustic device provided in a head-mounted display, or the one in which a vibrating element is embedded in the earpiece of a pair of eyeglasses and in which vibration of the earpiece transmits vibration sound.

Third Embodiment

Next, an example of a measurement method using the measurement device of the present disclosure is described below.

For example, various assessments may be made by the following measurement steps. (1) Attaching the acoustic device 100, which is configured to generate vibration, to the measurement device in a predetermined position. (2) Driving the acoustic device with a predetermined power. (3) Obtaining results of detection by the vibration detector in the measurement device.

Fourth Embodiment

Next, another example of a measurement method using the measurement device of the present disclosure is described below.

For example, various assessments may be made by the following measurement steps. (1) Attaching the acoustic device 100, which is configured to generate vibration, to the measurement device in a predetermined position. (2) Driving the acoustic device with a predetermined power. (3) Obtaining results of detection by the microphone in the measurement device.

REFERENCE SIGNS LIST

10 Measurement device
30 Base
50 Ear model unit
51 Ear model
52 Artificial external ear canal unit
53 Artificial external ear canal
54 Artificial cartilage unit
55 Vibration detector
56 Vibration detection element
57 Board
58 Microphone
70, 70' Holder
100 Acoustic device
101 Housing
102 Vibration element
103 Rubber material
110 Measurement device
130 Head model
150 Holder

The invention claimed is:

1. A measurement method of measuring an acoustic device configured to allow sound to be heard by vibration transmission to a human body, the measurement method comprising the steps of:
   bringing the acoustic device into abutment with an ear model unit including an ear model that is molded after a human ear and an artificial external ear canal unit that is continuous with the ear model; and
   generating test sound from the acoustic device;
   detecting, by a microphone disposed in the ear model unit at a terminal end of the artificial external ear canal unit opposite to the ear model, air conduction radiation components generated by vibration of an inner wall of the artificial external ear canal unit; and
   detecting vibration propagated to the artificial external ear canal unit via the ear model, by a vibration detector disposed in the ear model unit at a position in an opposite side to the ear model and apart from the artificial external ear canal.

2. The measurement method of claim 1, wherein
   the microphone is configured to measure both of an air conduction sound from the acoustic device and the air conduction radiation components.

3. The measurement method of claim 1, wherein
   the ear model unit has a part made of a material conforming to IEC60318-7.

4. The measurement method of claim 1, wherein
   the artificial external ear canal unit has a Shore hardness in the range of 20 to 60.

5. The measurement method of claim 1, wherein
   the ear model unit has a part made of a material having a Shore hardness of 35 or less.

6. The measurement method of claim 1, wherein
   the vibration detector is disposed in the ear model of the ear model unit.

* * * * *